United States Patent
Joung et al.

(10) Patent No.: US 8,461,288 B2
(45) Date of Patent: Jun. 11, 2013

(54) POLYESTER RESIN AND TONER COMPRISING SAME

(75) Inventors: Ui Gab Joung, Daejeon (KR); Hyung Jin Roh, Daejeon (KR); Yun Ju Chang, Daejeon (KR); Sung Hwan Cho, Daejeon (KR); Byung Ho Lim, Daejeon (KR)

(73) Assignee: Samyang Corporation, Seoul (KR)

(*) Notice: Subject to any disclaimer, the term of this patent is extended or adjusted under 35 U.S.C. 154(b) by 0 days.

(21) Appl. No.: 13/503,361

(22) PCT Filed: Oct. 22, 2010

(86) PCT No.: PCT/KR2010/007283
§ 371 (c)(1),
(2), (4) Date: Apr. 20, 2012

(87) PCT Pub. No.: WO2011/049404
PCT Pub. Date: Apr. 28, 2011

(65) Prior Publication Data
US 2012/0214960 A1 Aug. 23, 2012

(30) Foreign Application Priority Data
Oct. 22, 2009 (KR) .......... 10-2009-0100740

(51) Int. Cl.
*C08G 63/00* (2006.01)
*C08G 63/02* (2006.01)

(52) U.S. Cl.
USPC .......................................... 528/289

(58) Field of Classification Search
USPC .......................................... 528/289
See application file for complete search history.

(56) References Cited

FOREIGN PATENT DOCUMENTS

| | | |
|---|---|---|
| JP | 11-092553 A | 4/1999 |
| JP | 2000-275902 A | 10/2000 |
| JP | 2007-004149 A | 1/2007 |
| KR | 10-2006-0078310 A | 7/2006 |
| KR | 10-2008-0046951 A | 5/2008 |
| KR | 10-2008-0047798 A | 5/2008 |
| KR | 10-2008-0061630 A | 7/2008 |
| WO | WO 2009/066849 A1 | 5/2009 |

OTHER PUBLICATIONS

PCT International Search Report for PCT Counterpart Application No. PCT/KR2010/007283 containing Communication relating to the Results of the International Search Report, 5 pgs., (Jul. 29, 2011).

*Primary Examiner* — Terressa Boykin
(74) *Attorney, Agent, or Firm* — Blakely, Sokoloff, Taylor & Zafman LLP

(57) ABSTRACT

The present invention relates to a polyester resin prepared by adding an anti-hydrolysis agent to a reactant comprising an acid selected from an alkylester of aromatic dibasic acid or a mixture of an alkylester of aromatic dibasic acid and an alkylester of aliphatic dibasic acid, an aromatic diol and an aliphatic diol; and a toner produced by using the same as a binder resin.

8 Claims, No Drawings

POLYESTER RESIN AND TONER COMPRISING SAME

CROSS-REFERENCE TO RELATED APPLICATIONS

This patent application is a U.S. National Phase Application under 35 U.S.C. §371 of International Application No. PCT/KR2010/007283, filed Oct. 22, 2010, entitled POLYESTER RESIN AND TONER COMPRISING SAME, which claims priority to Korean Patent Application No. 10-2009-0100740, filed Oct. 22, 2009.

BACKGROUND

1. Technical Field

The present invention relates to a polyester resin with high resistance to hydrolysis and a toner comprising the same. More particularly, the present invention concerns a polyester resin prepared by adding an anti-hydrolysis agent to a reactant comprising an acid selected from an alkylester of aromatic dibasic acid or a mixture of an alkylester of aromatic dibasic acid and an alkylester of aliphatic dibasic acid; an aromatic diol; and an aliphatic diol, which has its acid value of 0.1 to 2.0 mgKOH/g and the hydroxyl radical value of 200 to 600 mgKOH/g, and a toner produced by using the polyester resin as a binder resin.

2. Background Art

Image formation has been traditionally accomplished by way of electrostatic recording, magnetic recording, toner jet and so forth. While there have been developed several methods and apparatuses for settling toner images on sheets such as papers, currently the most typical method is hot-pressing. The hot-pressing is advantageous to process rate and accuracy because a heat roller operates to compressively contact with a toner image. To form such a quick image, proposed is an art improving low-temperature fixability of toner by employing as a binder the polyester resin which has a low softening point. However, in the preparation of the polyester resin with the lower softening point, the required use of the smaller molecular weight results in a low degree of polymerization. The polyester resin with a low degree of polymerization has high acid value to degrade chargeability and moisture resistance, and has low glass transition temperature to deteriorate the blocking resistance.

For a binder resin, mostly required as cardinal functions are blocking resistance during the toner preservation and chargeability heavily affecting image formation. With respect to the blocking resistance, it is important for a toner-specific binder resin to maintain relatively high glass transition temperature without an effect of blocking even if temperature is high during the toner preservation. But if the glass transition temperature is too high, it is disadvantageous to low-temperature fixability and pulverizability thereof. The chargeability most seriously affecting image formation is represented in the dimensions of a quantity of electrified charges and moisture resistance. A quantity of electrified charges can be determined by measuring the charges of a toner and a toner-specific binder resin through a visual receptor of a copier or printer. In the toner-specific binder resin, charge quantity can be controlled by means of its monomer and molecular structure. Moreover, for the charge stability of the resin, it is necessary to ensure good moisture resistance so as to retain a constant charge quantity during a printing operation and prevent a decrease in the charge quantity of the resin at very humid conditions.

There have been disclosed technical manners in preceding documents by which the aforementioned functions for a binder resin can be accomplished, e.g. controlling acid values and blocking resistance by means of monofunctual isocyanate (refer to Japanese Patent Publication No. 2000-275902), enhancing moisture resistance and blocking resistance by means of monofunctual amine (refer to Japanese Patent Publication No. 11-092553), and adjusting acid values with an equivalence ratio of hydroxyl and acid radicals and monocarboxylic acid (refer to Japanese Patent Publication No. 2007-004149).

However, since the polyester resins produced from the former applications are kinds of acids whose terminals are made of carboxylic acids, their acid values are high while their hydroxyl radical values are low, incurring higher rates of moisture contents. Thus, toners produced from those resins are easily hydrolyzed to deteriorate durability and image quality, so that it is difficult to preserve them for a long term.

The present inventors have found out that when a polyester resin is left at room temperature, its softening temperature may be lowered with hydrolysis by hydrogen bonding between ester linkages in the chain of the polyester resin and/or carboxyl terminals of the resin and water. Accordingly, the inventors intended to develop a polyester resin with excellent hydrolysis resistance, filming resistance, moisture resistance, electrical characteristics and image stability through controlling of its acid value and hydroxyl radicals value thereby lowering its moisture content and through preventing hydrolysis of the resin with addition of anti-hydrolysis agent thereto.

An acid value and a hydroxyl radical value of a polyester resin generally affect moisture content thereof, thereby significantly effect on occurrence of hydrolysis by moisture during production of a toner with the polyester resin and on image formation and storage stability of the toner. Enhanced anti-hydrolysis of a polyester resin can be accomplished to reduce its moisture content by lowering its acid value and hydroxyl radical value. For controlling acid and hydroxyl radical values of a polyester resin, the following ways have been used: (1) varying a composition ratio of acidic and alcoholic components; (2) changing a reaction rate of esterification and polycondensation; and (3) employing a monomer other than acidic or alcoholic components.

The method (1) is carried out by using an excess of one component to adjust an acid value of a polyester resin. But, its commercial application may heavily increase product costs because an excess of the monomer must be consumed. The method (2) is adversely influential to physical properties of a polyester resin owing to change of the reaction rate, and the method (3) increases product costs and adversely affect the physical properties of a polyester resin owing to a new monomer further added thereto.

DETAILED DESCRIPTION OF THE INVENTION

Technical Subject

Accordingly, the present inventors controlled an acid value of a polyester resin by using an alkylester of aromatic dibasic acid or an alkylester of aliphatic dibasic acid, and by coincidentally regulating polymerization temperature, a catalytic amount, and a rate of decompression during polymerization, in order to reduce moisture content of a polyester resin without adverse effects.

Furthermore, in the present invention, an anti-hydrolysis agent is used to block moisture absorption, which is caused by hydrogen bonding between ester linkages in chains of a polyester resin and water, thereby preventing hydrolysis of the polyester resin by moisture; and to adjust an acid value of the polyester resin.

Therefore, the present invention is directed to provide a polyester resin with excellent hydrolysis resistance.

The present invention is further directed to provide a method of producing a polyester resin with specific ranges of acid and hydroxyl radical values.

The present invention is further directed to provide a toner prepared by using a polyester resin of the present invention as a binder, having improved anti-hydrolysis, filming resistance, moisture resistance, electrical characteristics and image stability.

Means for Solving the Problems

The present invention provides a polyester resin prepared by adding an anti-hydrolysis agent (C) to a reactant comprising an acid (A) selected from an alkylester of aromatic dibasic acid or a mixture of an alkylester of aromatic dibasic acid and an alkylester of aliphatic dibasic acid; an aromatic diol (B1); and an aliphatic diol (B2), which has acid value in the range of 0.1 through 2.0 mgKOH/g and hydroxyl radical in the range of 200 through 600 mgKOH/g; and a toner produced by using the polyester resin as a binder.

In an embodiment of the present invention provides, the reactant may comprise an acid (A) of 100 parts by mole weight selected from an alkylester of aromatic dibasic acid or a mixture of an alkylester of aromatic dibasic acid and an alkylester of aliphatic dibasic acid; an aromatic diol (B1) of 30 through 80 parts by mole weight; and an aliphatic diol (B2) of 10 through 50 parts by mole weight, and an anti-hydrolysis agent (C) of 0.5 through 3 wt %, based on the total weight of the reactant, may be added into the reactant.

In preparing a polyester resin according to the present invention, the reactant may further comprise one or more selected from a trihydric or polyhydric alcohol (B3) of 1.0 through 20 parts by mole weight or a cycloaliphatic diol (B4) of 10 through 30 parts by mole weight.

Another aspect of the present invention provides a method of preparing a polyester resin, comprising the steps of: reacting a reactant, which comprises an acid of 100 parts by mole weight selected from an alkylester of aromatic dibasic acid or a mixture of an alkylester of aromatic dibasic acid and an alkylester of aliphatic dibasic acid; an aromatic diol of 30 through 80 parts by mole weight, an aliphatic diol of 10 through 50 parts by mole weight; optionally a trihydric or polyhydric alcohol (B3) of 1.0 through 20 parts by mole weight and/or a cycloaliphatic diol (B4) of 10 through 30 parts by mole weight, at the temperature of 200 to 210 for 2 hours, 210 to 230° C. for one hour thereby to remove resulting alcohols and to obtain a first reaction product; gradually reducing pressure of the first reaction product from 760 mmHg until 50 mmHg under 230~240° C. for 1 through 3 hours and then eliminating resulting diol components with maintaining the condition till the first reaction product obtains a desired viscosity; and adding an anti-hydrolysis agent thereto under atmospheric pressure.

A polyester resin according to the present invention is suitable for a binder of toner. Therefore, an another aspect of the present invention is to provide a toner produced using a polyester resin of the present invention as a binder, which has high qualities of anti-hydrolysis, blocking resistance, moisture resistance, filming resistance, fixability and image stability.

Hereinafter, components and a preparation method for a polyester resin according to the present invention will be further detailed.

(A) Acid Component

For an acid component in the present invention, an alkylester of aromatic dibasic acid alone or a mixture of an alkylester of aromatic dibasic acid and an alkylester of aliphatic dibasic acid may be used.

(A1) Alkylester of Aromatic Dibasic Acid

In the present invention, an alkylester of aromatic dibasic acid is selected from lower alkylesters of terephthalic acid and isophthalic acid. The examples of a lower alkylester of aromatic dibasic acid include dimethyl terephthalate, dimethyl isophthalate, diethyl terephthalate, diethyl isophthalate, dibutyl terephthalate, dibutyl isophthalate and so on.

The alkylesters of aromatic dibasic acid in the present invention increases a glass transition temperature and reinforces blocking resistance, of a polyester resin and is also effective in moisture resistance of the resin because of its hydrophobic property. But owing to aromatic dibasic acid's terminals of carboxylic acid, the terminals of a polyester resin become carboxylic acid, which increases an acid value of the resin and thus renders the chargeability of the resin degraded. Therefore, in the present invention, a lower alkylester of aromatic dibasic acid of which terminals are substituted to ester is used so as to lower an acid value of a polyester resin thereby improving chargeability and moisture resistance of the resin.

(A2) Alkylester of Aliphatic Dibasic Acid

In the present invention, the alkylesters of aliphatic dibasic acid may be selected from fumaric acid, maleic acid, adipic acid, itaconic acid, gultaconic acid, succinic acid, citraconic acid and so on.

The alkylesters of aliphatic dibasic acid in the present invention improve pulverizability and reactivity of a polyester resin, thereby rendering an acid value of the resin lowered and improving moisture resistance of the resin.

The alkylesters of aliphatic dibasic acid may be used in combination of the alkylesters of aromatic dibasic acid (A1), whose desirable amount is of 1 to 30 parts by mole weight based on the total acid components (A) of 100 parts by mole weight.

(B) Alcoholic Components (B 1) Aromatic Diol

In the present invention, aromatic diol is helpful to elevating glass transition temperature of a polyester resin thereby enhancing blocking resistance of the resin.

The aromatic diols may be used in an amount of 30 to 80 parts by mole weight based on the total acidic components (A) of 100 parts by mole weight. If the amount of the aromatic diols is less than 30 parts by mole weight, a reaction rate of polymerization increases while thermostability and storage stability of a polyester resin become deficient. Otherwise, if the amount of the aromatic diols is more than 80 parts by mole weight, the thermostability and storage stability increase while the reaction rate decreases.

The aromatic diols include bisphenol A derivatives, e.g., polyoxyethylene-(2,0)-2,2-bis(4-hydroxyphenyl)propane, polyoxypropylene-(2,0)-2,2-bis(4-hydroxyphenyl)propane, polyoxypropylene-(2,2)-polyoxyethylene-(2,0)-2,2-bis(4-hydroxyphenyl)propane, polyoxyethylene-(2,3)-2,2-bis(4-hydroxypheny)propane, polyoxypropylene-(6)-2,2-bis(4-hydroxyphenyl)propane, polyoxypropylene-(2,3)-2,2-bis(4-hydroxyphenyl)propane, polyoxypropylene-(2,4)-2,2-bis(4-hydroxyphenyl)propane, polyoxypropylene-(3,3)-3,3-bis(4-hydroxyphenyl)propane, polyoxyethylene-(3,0)-2,2-bis(4- hydroxyphenyl)propane, polyoxyethylene-(6)-2,2-bis(4-hydroxyphenyl)propane, etc. One or more of them can be used.

(B2) Aliphatic Diol

In the present invention, the aliphatic diols improve reactivity of polymerization and lower an acid value of a polyester resin thereby reinforcing pulverizability of the resin. According to the present invention, the aliphatic diols may be selected from ethylene glycol, diethylene glycol, triethylene glycol, 1,2-propylene glycol, 1,2-propanediol, 1,4-butanediol, 1,4-butenediol, neopentine glycol, 2,3-butanediol, 1,5-pentanediol, 2,3-pentanediol, 1,6-hexanediol, 2,3-hexanediol, 3,4-hexanediol, 1,7-heptanediol, dodecanediol, 1,4-cyclohexane dimethanol, 1,4-cyclohexanediol, neopentyl glycol, etc. The aliphatic diols may be used in an amount of 10 to 50 parts by mole weight based on the total acidic components of 100 parts by mole weight. If the aliphatic diols are used in an amount of less than 10 parts by mole weight, the reaction rate of polymerization sharply decreases. Otherwise, if the aliphatic diols are used in an amount of more than 50 parts by mole weight, glass transition temperature (Tg) of a polyester resin fall downs and thus thereby leading to deterioration in thermostability, storage stability and blocking resistance of the resin.

(B3) Trihydric or Polyhydric Alcohol

According to the present invention, a trihydric or polyhydric alcohol in the preparation of a polyester resin may be added so as to improve its thermostability. This trihydric or polyhydric alcohols are effective in increasing glass transition temperature of the resin, granting cohesiveness to the resin, and reinforcing offset resistance of the resin.

The trihydric or polyhydric alcohols are selected from trimethylol ethane, trimethylol propane, 2-methyl propanetriol, glycerol, 1,2,5-pentanetriol, 1,2,4-butanetriol, Pentaerythritol, dipentaerythritol, tripentaerythritol, sorbitol, 2-hydroxymethylpropane-1,3-diol, 2-methyl-1,2,4-butanetriol, 1,3,5-trihydroxymethyl benzene, 1,2,3,6-hexanetetrol, 1,4-sorbitan and a combination thereof. The trihydric or polyhydric alcohols may be used in an amount of 1.0 to 20 parts by mole weight based on the total acidic components (A) of 100 parts by mole weight. If the trihydric or polyhydric alcohols are used in an amount of less than 1.0 part by mole weight, a resin to be produced becomes deficient in thermostability and its distribution profile of molecular weight becomes narrower to deteriorate low-temperature fixability of the resin. Otherwise, if the trihydric or polyhydric alcohols are used in an amount of more than 20 parts by mole weight, gelation of the resin occurs and the acid value of the resin increases thereby degrading its moisture resistance and chargeability.

(B4) Cycloaliphatic Diol

According to the present invention, for the purpose of rendering a polyester resin to have an extended fixable area and to improve moisture resistance thereby keeping good image density of a toner, cycloaliphatic diols may be added in the preparation of a polyester resin.

The cycloaliphatic diols are selected from 1,4-cyclohexane dimethanol, 1,2-cyclohexane dimethanol, 1,3-cyclohexane dimethanol, cis-1,4-cyclohexane dimethanol, cis-1,2-cyclohexane dimethanol, cis-1,3-cyclohexane dimethanol and a combination thereof. The cycloaliphatic diols may be used in an amount of 10 to 30 parts by mole weight based on the total acidic components (A) of 100 parts by mole weight.

The acidic component (A) and alcoholic component (B) are reactants for preparing a polyester resin. The said reactants may additionally contain additives normally utilized in this industry. The suitable kinds and contents of such additives can be set by those ordinarily skilled in the art.

(C) Anti-Hydrolysis Agent

In the present invention, the anti-hydrolysis agents bond with carboxylic acid groups at the terminals of a polyester resin thereby lowering the acid value and extend the chains of the resin, and thus enhancing thermal endurance of the resin. Additionally, the anti-hydrolysis agents are effective in preventing hydrolysis of a polyester resin caused by moisture and then suppressing an increase of the acid value of the resin promoted by hydrolysis.

According to the present invention, the anti-hydrolysis agents are selected from phenolic, oxazolinic and carbodiimidic compounds. Especially, oxazolinic or carbodiimidic compounds are preferred as the anti-hydrolysis agent. An oxazolinic anti-hydrolysis agent is more preferred.

Phenolic anti-hydrolysis agents include sterically hindered phenol, thiobisphenol, alkylidene bisphenol, alkyl phenol, hydroxybenzoylic compound, acylamino phenol, hydroxyphenyl propionic acid, etc. The phenolic anti-hydrolysis agents are effective in suppressing or slowing down hydrolysis derived from ester linkages.

An oxazolinic or carbodiimidic anti-hydrolysis agent is effective in repairing bonds that have been broken by hydrolysis. Compounds with this function include mono- or polycarbodiimide, 1,3-phenylene-bis-(2-oxazoline), etc.

The anti-hydrolysis agents may be added in an amount of 0.5 to 3.0 wt % based on the total weight of the reactant. If the amount of the anti-hydrolysis agents is less than 0.5 wt %, the effects of preventing hydrolysis and dropping its acid value are insignificant thereby deteriorating the properties of moisture resistance and anti-hydrolysis. If the amount of the anti-hydrolysis agents is more than 3.0 wt %, the anti-hydrolysis agents are released out of the surface of a polyester resin, resulting in degradation of image stability, quality and gloss of a toner. In particular, it causes an excessive extension of polymer chains in a resin, causing a softening temperature to be increased thereby rendering image stability worse of a toner.

A polyester resin according to the present invention may be prepared through two reactions of esterification and polycondensation, like a general polyester rein.

Esterification is carried out by reacting an acidic component (A) with an alcoholic component (B) at the temperature of 200 to 210° C. for 2 to 3 hours, 210 to 230° C. for 1~2 hours, while removing alcohols derived from the reaction. Out of the said range of the reaction temperature, a conversion rate decreases. With an insufficient reaction time, unreacted acidic components can be sublimated to unfortunately clog a distillation column and unreacted monomers can raise its acid value during polycondensation.

After the esterification, polycondensation is carried out at the reaction temperature of 230 to 240° C. The reaction temperature of lower than 230° C. will make the reaction time longer and a degree of polymerization lower, resulting in an increase of the acid value of a resin. But the reaction temperature of over 240° C. will promote the reaction process so rapidly to make it difficult to control the process, resulting in higher acid value due to abrupt gelation or pyrolysis.

During the polycondensation, pressure is slowly reduced from atmosphere pressure (760 mmHg) to 100 mmHg or 10 mmHg over 1 to 3 hours and then is maintained in 70 mmHg or 30 mmHg, preferably 50 mmHg or 40 mmHg, until a reaction product obtains a desired viscosity, while diols generated therefrom are removed. If a decompression travel time is less than one hour, reactants with low molecular weight do not react and are removed to clog a vacuum tube up. If a decompression travel time becomes longer than 3 hours, the reaction time is lengthened to be uneconomical. Meanwhile, if the final pressure is no more than 30 mmHg, the reaction proceeds so quickly to make it difficult to conduct process control. In that condition, abrupt gelation of a resin occurs, resulting in increase of its acid value. Further, if the final pressure goes over 70 mmHg, the reaction time becomes longer.

After completing the polycondensation, an anti-hydrolysis agent is added to the reaction product at room temperature to obtain a polyester resin.

According to the present invention, a catalyst utilized in the esterification and polycondensation is selected from titanic catalysts, zinc acetate catalysts, and a combination thereof.

An appropriate content of the catalyst ranges from 500 through 1100 ppm based on the total acidic component (A). If the concentration of the catalyst is less than 500 ppm, a polyester resin would not have a desirable degree of polymerization, resulting in an increase of acid value. On the contrary, in case of concentration higher than 1100 ppm, the catalyst remains as a precipitate to slow a reaction time of polymerization down, resulting in degrading transparence of a polyester resin. In such condition, an abrupt reaction makes it difficult to control process control and too much gelation in a resin causes its acid value to be raised unfortunately, as well as lowers glass transition temperature of the resin.

In the present invention, an acid value of the polyester resin is preferably 0.1 to 0.2 mgKOH/g. If the acid value is less than 0.1 mgKOH/g, it can deteriorate chargeability so that it may adversely affect image formation. Additionally, if the acid value exceeds 2.0 mgKOH/g, it can deteriorate moisture resistance to make long-term storage stability worse.

In the present invention, a hydroxyl radical value of the polyester resin is preferably 200 to 600 mgKOH/g, more preferably 300 to 500 mgKOH/g. If the hydroxyl radical of the polyester resin value is less than 200 mgKOH/g, the fixability of a printed image may be worsened. And if the hydroxyl radical value exceeds 600 mgKOH/g, it may weaken filming resistance.

In the meantime, in the present invention, glass transition temperature of the polyester resin is preferably in the range of 55 to 80° C. If the glass transition temperature of the polyester resin value is lower than 55° C., the storage stability of a toner may be weakened. And if the glass transition temperature is higher than 80° C., it may adversely affect low-temperature fixability and pulverizability. The softening temperature of a polyester resin preferably 100 to 170° C. If the softening temperature is lower than 100° C., the glass transition temperature becomes lower to degrade blocking resistance and offset property. If the softening temperature is higher than 170° C., it would worsen low-temperature fixability.

The present invention also provides a toner comprising a polyester resin according to the present invention. A according to the present invention may further comprise general additives such as colorants, charge control agents, wax and so forth. Contents of the polyester resin and the additives can be determined by those ordinarily skilled in the art. A toner according to the present invention can be produced by way of a process known in the art.

Effects

As stated above, a polyester resin according to the present invention is characterized by having improved anti-hydrolysis, low-temperature fixability, moisture resistance and electricity. Especially, a toner prepared by using a polyester resin according to the present invention as a binder has excellent anti-hydrolysis, low-temperature fixability, filming resistance, electricity, image stability and long-term storage stability.

The Best Mode for Carrying Out the Invention

Hereinafter, the present invention will be detailed by, but not limited to, the following examples.

EXAMPLES

Examples 1 Through 6 and Comparative Examples 1 Through 6

In a 15-liter melting condensation reactor, to a reactant having the component and contents as shown in the following Table 1, added was a titanic catalyst in an amount of 700 ppm to the total acidic component (A or A'). Esterification was carried out at the reaction temperature of 200 to 210° C. for 2 hours, 210 to 230° C. for 1 hour. After the resultant alcohol is removed, polycondensation catalyst was added to the reactant to begin a process of polycondensation. In this polycondensation process, reaction temperature was maintained at 230 to 240° C. and pressure was slowly reduced from the normal 760 mmHg until 40 mmHg over 3 hours. After the polycondensation, the anti-hydrolysis agent (C) was added to the reaction product under atmosphere pressure and the reaction product was agitated for 20 minutes to produce a polyester resin.

TABLE 1

| Components | Examples | | | | | | Comparative examples | | | | | |
|---|---|---|---|---|---|---|---|---|---|---|---|---|
| (part by mole weight) | 1 | 2 | 3 | 4 | 5 | 6 | 1 | 2 | 3 | 4 | 5 | 6 |
| Dimethyl terephthalate (A1) | 100 | 100 | 100 | 100 | 100 | 100 | 70 | — | — | — | 85 | 70 |
| Terephthalic acid (A1') | — | — | — | — | — | — | — | 80 | 70 | 100 | — | — |
| Adipic acid (A2') | — | — | — | — | — | — | 30 | — | 10 | — | — | 30 |
| Trimellitic anhydride (A2') | — | — | — | — | — | — | — | 20 | 20 | — | 15 | — |
| BHPP (B1) | 45 | 60 | — | 50 | 40 | 40 | 45 | 35 | 40 | — | 10 | — |
| BHEP (B1) | 25 | — | 40 | 25 | — | — | 25 | 25 | — | 32 | — | 40 |
| Ethylene glycol (B2) | 10 | 25 | 32 | 15 | 10 | 15 | 10 | 10 | 15 | 25 | 90 | 30 |
| Neopentyl glycol (B2) | — | — | — | — | — | 25 | — | — | 45 | — | — | — |
| 1,2-Propanediol (B2) | — | — | — | — | 35 | — | — | — | — | 50 | — | — |
| Glycerol (B3) | — | — | — | — | 15 | 20 | — | — | — | — | — | 30 |
| Trimethylol propane (B3) | 20 | 15 | 18 | 10 | — | — | 20 | — | — | 18 | — | — |
| 1,4-Cyclohexane dimethanol (B4) | — | — | 10 | — | — | — | — | 10 | — | — | — | — |

TABLE 1-continued

| Components | Examples | | | | | | Comparative examples | | | | | |
|---|---|---|---|---|---|---|---|---|---|---|---|---|
| (part by mole weight) | 1 | 2 | 3 | 4 | 5 | 6 | 1 | 2 | 3 | 4 | 5 | 6 |
| Anti-hydrolysis agent (C) [wt %] | 0.8 | 1.0 | 2.5 | 2.0 | 1.5 | 1.5 | — | 0.2 | 5 | 10 | — | 20 |

BHPP: polyoxyprophylene-(n)-2,2-bis(4-hydroxyphenyl)propane
BHEP: polyoxyethylene-(n)-2,2-bis(4-hydroxyphenyl)propane
Anti-hydrolysis agent: 1,3-phenylene-bis-(2-oxazoline)
Wt %: a weight ratio based on the total weight of the rest components Evaluation of Physical Properties The following Table 2 shows each value of softening temperature ($T_{1/2}$), glass transition temperature (Tg), acid value (mgKOH/g), hydroxyl radical value (mgKOH/g) and gel content (%) of a polyester resins prepared according to Examples 1 through 6 and Comparative Example 1 through 6.

Softening temperature was determined with a flow tester (e.g. CFT-500D). By using a nozzle with a diameter of 1 mm and a height of 1 mm, 1.5 g of a sample was measured at the temperature rise rate of 6° C./min in the load of 20 kgf.

Glass transition temperature (Tg) was measured with a differential scanning calorimetry (DSC), after the sample was heated up at the temperature rise rate of 10° C./min, cooled down, and then re-heated up.

The acid value (mgKOH/g) was determined through the following steps: dissolving 0.15 g of a sample and 5 ml of benzyl alcohol in a test tube; pouring the mixture into a beaker containing 10 ml of chloroform; adding a phenol red thereto; and neutrally titrating carboxyl groups in the polymer by means of caribenzyl hydroxide alcoholic solution.

Hydroxyl radical value (mgKOH/g) was measured under the standard of JIS K0070 (1992's version).

Gel content (%) was determined from the remnant content measured through the course of dispersing a 0.5 g of specimen in tetrahydrofuran (THF) solution; heating and refluxing the mixture for 3 hours; filtering the mixture by a 3G3 micro glass filter; and drying the filtrate.

To evaluate the degree of blocking resistance, moisture resistance, filming resistance, fixability and image stability for a toner, a toner composition was obtained by mixing 92 wt % of a polyester resin prepared according to Examples 1 to 6 and Comparative Examples 1 to 6, 4 wt % of a carbon black, 1 wt % of a charge control agent and 3 wt % of canauba wax in a Henschel mixer for 5 minutes and melt-kneading the mixture through a twin screw extruder. The toner composition was pulverized by a jet-mill-typed 100AFG (manufactured by Hosokawa Alpine) pulverizer in average granularity of 9.0 µm. The physical properties of the produced toner are shown in Table 2.

Blocking resistance was measured with the degrees of cohesion and wax blooming after 10 g of the pulverized toner grains were put into a 20 ml-vial and left in an oven at 60° C. for 48 hours.

Moisture resistance was determined with the water content measured after 10 g of the pulverized toner grains were put into a 20 ml-vial, dried in an oven at 60° C. for 15 hours, and left for 7 days under the condition of 25° C. and humidity of 68%.

Filming resistance was evaluated by observing smears on a printed image and a visual receptor which had been obtained after a print test with 5000 sheets by a laser printer.

Fixability was evaluated by a content of toner remnant after the course of attaching a 3M tape to a printed paper, polishing the printed paper with a plummet of 500 g in 10 times, and removing the tape from the paper.

Image stability was evaluated by the concentration change of a resultant image after conducting a print test with 5000 sheets by a laser printer.

TABLE 2

| Physical Property | Examples | | | | | | Comparative Examples | | | | | |
|---|---|---|---|---|---|---|---|---|---|---|---|---|
| | 1 | 2 | 3 | 4 | 5 | 6 | 1 | 2 | 3 | 4 | 5 | 6 |
| Softening Temperature [° C.] | 135 | 110 | 145 | 128 | 155 | 140 | 154 | 91 | 100 | 146 | 118 | 155 |
| Softening Temperature after extrusion [° C.] | 133 | 108 | 143 | 126 | 153 | 138 | 147- | 86 | 101 | 148 | 112 | 158 |
| Tg [° C.] | 66 | 62 | 67 | 64 | 68 | 68 | 66 | 65 | 63 | 62 | 57 | 69 |
| Acid value [mgKOH/g] | 1.2 | 1.5 | 1.2 | 0.8 | 1.8 | 0.9 | 12 | 20 | 15 | 10 | 11 | 13 |
| Hydroxyl radical value [mgKOH/g] | 301 | 335 | 405 | 460 | 300 | 390 | 93 | 56 | 80 | 112 | 100 | 180- |
| Gel content [%] | 10 | 3 | 13 | 8 | 16 | 14 | 15 | 25 | 22 | 17 | 6 | 20 |
| Blocking resistance[1] | 5 | 4 | 5 | 5 | 5 | 5 | 3 | 4 | 4 | 3 | 3 | 4 |
| Moisture resistance[2] | 5 | 5 | 5 | 5 | 5 | 5 | 3 | 1 | 1 | 2 | 2 | 2 |
| Filming resistance[3] | ◎ | ◎ | ◎ | ◎ | ◎ | ◎ | Δ | X | X | Δ | X | Δ |
| Fixability[4] | 5 | 5 | 5 | 5 | 5 | 5 | 5 | 1 | 1 | 2 | 2 | 2 |
| Image stability[5] | ◎ | ◎ | ◎ | ◎ | ◎ | ◎ | Δ | X | X | X | X | X- |

Evaluation criteria
[1]Blocking resistance 5—no cohesion; 4—microscopic surface cohesion, dispersed in one or two times of vibration; 3—microscopic cohesion, dispersed in three or four times of vibration; 2—partial cohesion, not dispersed in vibration; 1—complete aggregate.

TABLE 2-continued

| Physical | Examples | | | | | | Comparative Examples | | | | | |
|---|---|---|---|---|---|---|---|---|---|---|---|---|
| Property | 1 | 2 | 3 | 4 | 5 | 6 | 1 | 2 | 3 | 4 | 5 | 6 |

[2]Moisture resistance 5—moisture content 0 to 1400 ppm; 4—moisture content 1400 to 1500 ppm; 3—moisture content 1500 to 1600 ppm; 2—moisture content 1600 to 1700 ppm; 1—moisture content over 1700 ppm.
[3]Filming resistance ⊚—no smear; Δ—a little of smear; X—a lot of smear.
[4]Fixability 5—over 90% of remnant content; 4—80 to 90% of remnant content; 3—70 to 80% of remnant content; 2—60 to 70% of remnant content; 1—less than 60% of remnant content.
[5]Image stability ⊚—no density change; Δ—some density change; X—heavy density change.

As shown in Table 2, a toner according to the present invention was generally characterized in that it has good qualities for blocking resistance, moisture resistance, filming resistance and image stability. But, Comparative Example 1 shows, as different from Example 1, that its acid value became higher while its hydroxyl radical value became lower, resulting in the degradation of moisture resistance and filming resistance, because of using a mixture of an alkylester of aromatic dibasic acid and an aliphatic dibasic acid. As also, Comparative Example 2 shows that its acid value became higher while its hydroxyl radical value became lower, resulting in degradation of moisture resistance and filming resistance, because of using an aromatic dibasic acid and a trihydric or polyhydric carboxylic acid as the acidic component (A). Comparative Example 3 used an aromatic diol (B1) and an aliphatic diol (B2) as like Example 3, whereas a content of the aliphatic diol was out of the range according to embodiments of the present invention, causing moisture resistance, filming resistance, fixability and image stability to be worse entirely due to a higher acid value and a lower hydroxyl radical value because of using an aromatic dibasic acid, an aliphatic dibasic acid, and a trihydric or polyhydric carboxylic acid as the acidic component (A). Comparative Example 4 used a trihydric or polyhydric alcohol (B3) as like Example 4, whereas the properties of moisture resistance and filming resistance were also degraded due to a higher acid value and a lower hydroxyl radical value because of using aromatic dibasic acid as the acidic component (A). Comparative Example 5 and 6 show that their acid value became higher while their hydroxyl radical value became lower, resulting in degradation of moisture resistance, filming resistance, fixability and image stability entirely, because of using an alkylester of aromatic dibasic acid and a trihydric or polyhydric carboxylic acid or an aliphatic dibasic acid as the acidic component (A).

Meanwhile, as like Comparative Example 2, in case of extruding an anti-hydrolysis agent in an amount of less than 0.5 wt % to the total, softening temperature was much lowered due to hydrolysis by moisture. Further, as like Comparative Examples 3, 4 and 6, in case of using an anti-hydrolysis agent in an amount of more than 3.0 wt %, there was an effect of blocking hydrolysis by water, but the high content of the agent increased softening temperature.

Examples 7 Through 9 and Comparative Examples 7 Through 9

In order to find out an effect of an anti-hydrolysis, a polyester resin was prepared according to the same composition, content and reaction conditions as in Example 1, except that a content of anti-hydrolysis agent varied. Then, a toner was made from the said polyester resin as in Example 1. Physical properties of these resin and toner were measured as in Example 1. The results are shown in the following Table 3.

TABLE 3

| | Examples | | | Comparative Examples | | |
|---|---|---|---|---|---|---|
| Physical Property | 7 | 8 | 9 | 7 | 8 | 9 |
| Anti-hydrolysis agent's content [wt %] | 0.8 | 1.0 | 2.2 | 0.3 | 4.0 | 15.0 |
| Softening Temperature [ ] | 127 | 137 | 145 | 125 | 146 | 132 |
| Softening Temperature after extrusion [ ] | 124 | 135 | 143 | 120 | 147 | 136 |
| Tg [ ] | 63 | 65 | 67 | 65 | 71 | 70 |
| Acid value [mgKOH/g] | 0.5 | 0.6 | 0.8 | 1.0 | 0.3 | 0.2 |
| Hydroxyl radical value [mgKOH/g] | 300 | 303 | 361 | 294 | 403 | 428 |
| Gel content [%] | 5 | 7 | 10 | 4 | 9 | 8 |
| Blocking resistance[1] | 5 | 5 | 5 | 5 | 5 | 5 |
| Moisture resistance[2] | 5 | 5 | 5 | 5 | 5 | 5 |
| Filming resistance[3] | ⊚ | ⊚ | ⊚ | ⊚ | ⊚ | ⊚ |
| Fixability[4] | 5 | 5 | 5 | 5 | 4 | 4 |
| Image stability[5] | ⊚ | ⊚ | ⊚ | Δ | X | X |

The evaluation criteria of items 1) through 5) are the same as shown in the bottom of Table 2.

The evaluation criteria of items 1) through 5) are the same as shown in the bottom of Table 2.

As shown in Table 3, with different contents of the anti-hydrolysis agent, the resultant acid values, the hydroxyl radical values and anti-hydrolysis of the polyester resins with the composition as in Example 1 varied. As shown in Comparative Example 7, in case of adding an anti-hydrolysis agent in an amount of less than 0.5 wt % based on the total weight of the remnant component and then extruding the polyester resin, it was revealed that hydrolysis occurred to drop softening temperature. To the contrary, as shown in Comparative Examples 8 and 9, in case of adding an anti-hydrolysis agent in a large amount and then extruding the polyester resin, it was found out that image stability was deteriorated.

What is claimed is:

1. A polyester resin prepared by adding an anti-hydrolysis agent (C) to a reactant comprising an acid (A) selected from an alkylester of aromatic dibasic acid or a mixture of an alkylester of aromatic dibasic acid and an alkylester of aliphatic dibasic acid; an aromatic diol (B1); and an aliphatic diol (B2).

2. The polyester resin according to claim 1, wherein the reactant comprises the acid (A) of 100 parts by mole weight, the aromatic diol (B1) of 30 through 80 parts by mole weight, and the aliphatic diol (B2) of 10 through 50 parts by mole weight, and based on the total weight of the reactant, the anti-hydrolysis agent (C) of 0.5 through 3 wt % is added to the reactant.

3. The polyester resin according to claim 2, wherein the reactant further comprises one or more alcohol component selected from a trihydric or more polyhydric alcohol (B3) of 1.0 through 20 parts by mole weight or a cycloaliphatic diol (B4) of 10 through 30 parts by mole weight.

4. The polyester resin according to claim 1, the polyester resin has the acid value of 0.1 through 2.0 mgKOH/g and the hydroxyl radical value of 200 through 600 mgKOH/g.

5. The polyester resin according to claim 1, wherein the alkylester of aromatic dibasic acid is selected from the group consisting of dimethyl terephthalate, dimethyl isophthalate, diethyl terephthalate, diethyl isophthalate, dibutyl terephthalate, dibutyl isophthalate, and combination thereof.

6. The polyester resin according to claim 1, wherein the alkylester of aliphatic dibasic acid is one or more selected from alkylesters of maleic acid, adipic acid, itaconic acid, gultaconic acid, succinic acid and citraconic acid.

7. The polyester resin according to claim 1, wherein the anti-hydrolysis agent is selected from the group consisting of 1,3-phenylene-bis-(2-oxazoline), mono- or poly-carbodiimide, sterically hindered phenol, thiobisphenol, alkylidene bisphenol, alkyl phenol, hydroxybenzoylic compound, acylamino phenol and propionic hydroxyphenyl.

8. A toner prepared using a polyester resin as a binder resin, wherein the polyester resin is prepared by adding an anti-hydrolysis agent (C) to a reactant comprising an acid (A) selected from an alkylester of aromatic dibasic acid or a mixture of an alkylester of aromatic dibasic acid and an alkylester of aliphatic dibasic acid; an aromatic diol (B1); and an aliphatic diol (B2).

\* \* \* \* \*